Dec. 2, 1947.  L. W. VAN DUSEN  2,431,847
MAP PROJECTION DEVICE
Filed Nov. 8, 1943   3 Sheets-Sheet 1

Inventor
Lawrence W. Van Dusen

By Lyon+Lyon
Attorneys

Dec. 2, 1947.                L. W. VAN DUSEN                2,431,847
                            MAP PROJECTION DEVICE
                             Filed Nov. 8, 1943                3 Sheets-Sheet 2

Inventor
Lawrence W. Van Dusen
By Lyon & Lyon
Attorneys

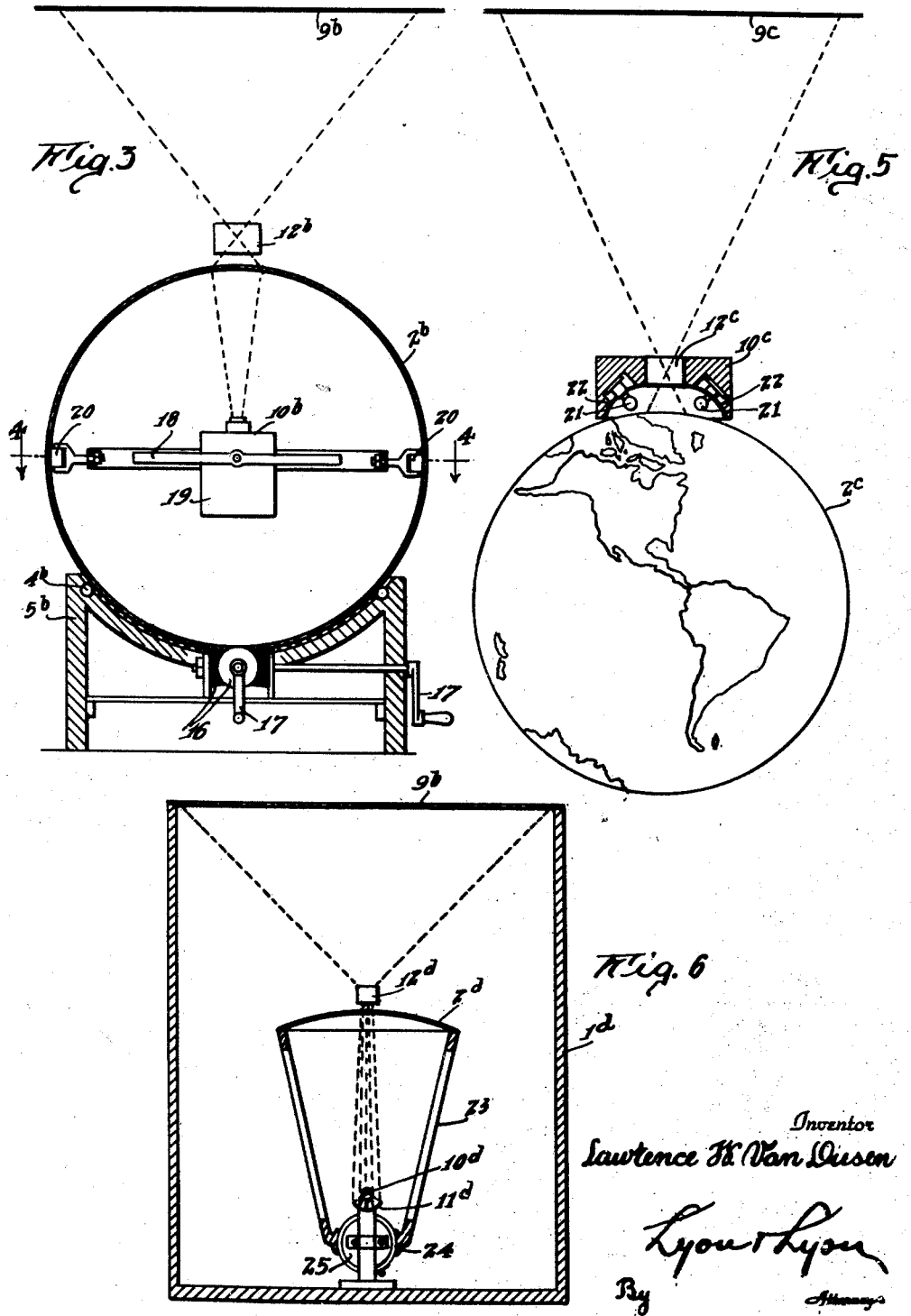

Patented Dec. 2, 1947

2,431,847

UNITED STATES PATENT OFFICE 2,431,847

MAP PROJECTION DEVICE

Lawrence W. Van Dusen, San Diego, Calif., assignor to Van Dusen Engineering Company, San Diego, Calif., a copartnership Application November 8, 1943, Serial No. 509,456

1 Claim. (Cl. 88—24)

This invention relates to map devices, and more particularly to a map device providing for the projection from a spherical map surface of a representation of such surface on a very large scale. In navigation, either by ship or aircraft, it is generally most advantageous to follow a great circular course. In flat scale maps such great circular courses are difficult to determine and of course during navigation it is difficult to lay out such a course from a plane surface map.

It is therefore an object of this invention to provide a means by which a portion of the surface of a spherical or curved map may be projected in exact scale and in exact proportional relationship with each and every other surface of the sphere representing the earth's surface so that such navigation courses may be more easily followed.

Another object of this invention is to provide a map device providing for the representation of a portion of the surface of a curved map on a large scale.

Another object of this invention is to provide a map device including a glass sphere upon the surface of which a map is correctly represented and wherein means are provided for projecting a sector of the sphere and on an enlarged scale.

Another object of this invention is to provide a hollow glass sphere map and a projector light operative in conjunction therewith, and means for mounting the sphere so that it may be rotated to any desired position whereby any portion of the spherical map may be projected on an enlarged scale.

Other objects and advantages of this invention it is believed will be apparent from the following detailed description of a preferred embodiment thereof as illustrated in the accompanying drawings.

In the drawings:

Figure 3 is a diagrammatic view of a modified form of map device embodying my invention illustrated in the map device as supported within the interior of the sphere.

Figure 5 is a similar view of another modified form of my invention illustrating the light projecting means as mounted for use in connection with a reflective surface of a sphere.

Figure 6 is a modified form of my invention illustrating the same as adapted for use in connection with a spherical segment map.

Figure 1:
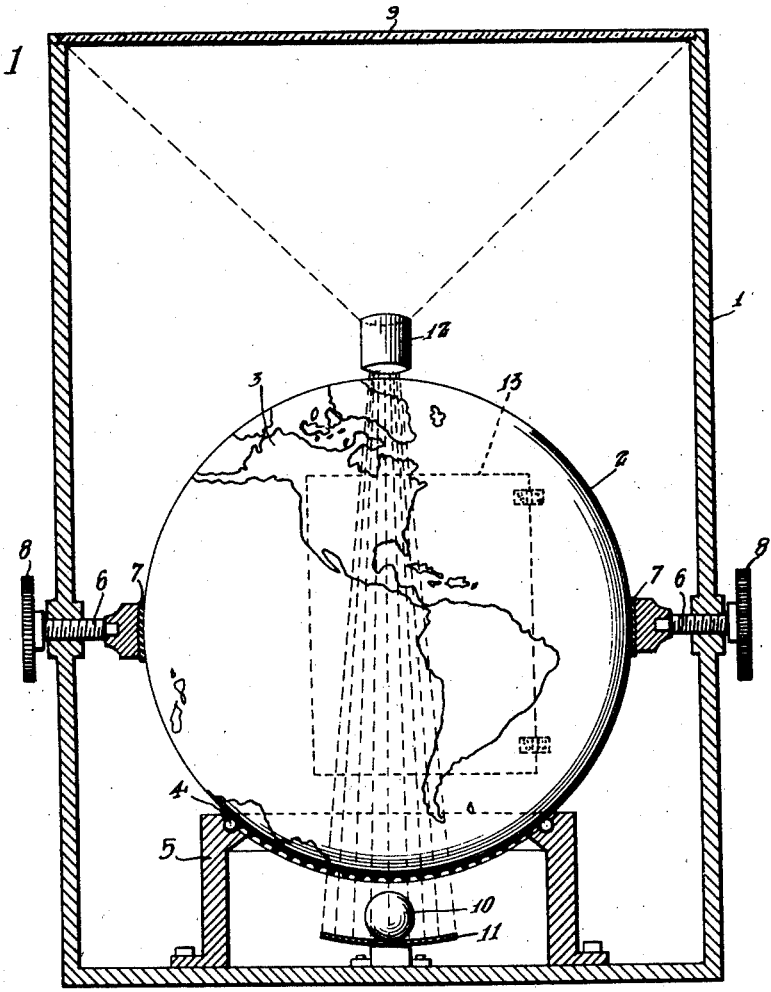
Figure 1 is an elevation partly in vertical section of the map device embodying my invention.
Figure 4:
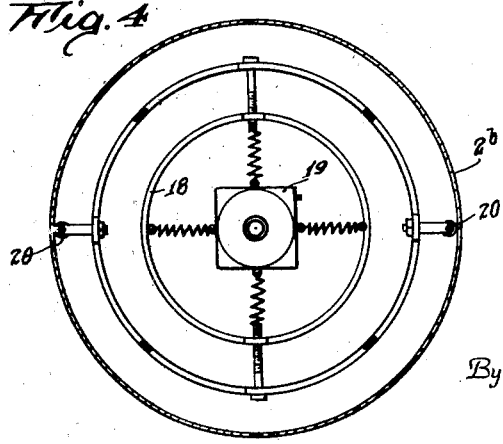
Figure 4 is a sectional view taken substantially on the line 4—4 of Figure 3.
Figure 2:
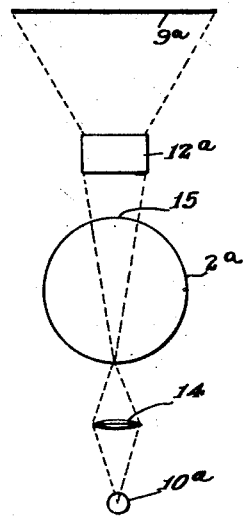
Figure 2 is a diagrammatic illustration on a reduced scale of a modified light projection system applicable in connection with the map device as illustrated in Figures 1 and 2.

In the modification of my invention as illustrated in Figures 1 and 2, I have illustrated a container 1 in which there is mounted a sphere 2 having suitably imposed upon its surface a map 3 representative of the earth. The sphere 2 is a transparent sphere while the map 3 in this modification of my invention would be a negative print of a map of the earth's surface.

The sphere 2 is mounted within the container 1 so as to be universally rotatable and for this purpose is illustrated as being mounted upon bearings 4 supported in a bearing support 5.

Threaded through the container 1 at diametrically opposed points above the bearings 4 are trunnions 6 which carry pressure pads 7 upon their inner ends adapted to aid in supporting the sphere 2 upon the bearings 4 and which are also applicable to lock the sphere in its position of rotation within the container 1. The trunnions extend through the container 1 and are provided with knurled heads 8 by which they may be adjusted from the exterior of the container. Mounted upon the upper surface of the container 1 is a ground glass 9 adapted to receive the projected map from the sphere 2 on an enlarged scale so that it may be directly viewed.

Means are provided for projecting light through the portion of the map 3 desired to be viewed upon the ground glass 9, which means include a lamp 10 lighted from any suitable source of electrical current (not indicated) and carrying a concave reflector 11 to receive the rays of light from the lamp 10 to project the same through the transparent sphere 2 to pick up the image of the map lying within the path of the rays. Mounted in the path of light thus projected is a correcting and magnifying lens 12 through which the projection is corrected to a substantially plane surface projection for reception upon the surface of the ground glass 9.

It is preferable that the mirror 11 be of a curvature from approximately the same center as the sphere.

Any suitable or desirable means may be provided for rotating the sphere 2 within the container 1 which means may include any suitable aperture or door within the container 1 as indicated at 13 which may be opened so that the sphere 2 may be rotated by hand to such position that the desired position of the surface is projected upon the ground glass 9 after which the trunnion 6 may be tightened to hold the sphere in desired adjusted position.

In the modified optical system of Figure 2, the lamp 10a is mounted a greater distance from the sphere 2a and interposed between the sphere and the lamp is a lens 14 so that the light rays from the lamp after passing through the lens 14 converge substantially at the surface of the sphere most adjacent the lamp, and then diverge outwardly to cover an area 15 of the map upon the sphere 2a which it is desired to enlarge and view. After the light passes through this section 15 of the sphere 2a, it passes through a suitable correcting and enlarging lens 12a before reaching the ground glass 9a. In other respects this modification of my invention is similar to that illustrated in Figure 1.

In the modification of my invention illustrated in Figure 3 similar parts have been indicated with similar numerals with the addition of an exponent b thereto.

In this modification of my invention the light source is mounted within the interior of the hollow sphere and the sphere is supported upon spherical rollers 16 rotated by a crank 17 so that the sphere may be rotated to the desired position to position the surface desired to be projected in line between the light source 10b and ground glass 9b. In this modification of my invention the light source 10b is supported within a carriage 18 and is weighted due to the weight of the batteries mounted within the container 19 which supply the source of electrical energy for the lamp 10b. The carriage 18 is supported from a plurality of rollers 20 which ride upon the interior surface of the sphere 2b, thereby maintaining the light source substantially upon the center of the sphere and in position to direct the light upwardly. Any other suitable form of mechanism may be employed for suspending the light source within the interior of the sphere and the above described mechanism is merely chosen as being most simple for illustration. This requires that the sphere be constructed in two halves which are loosely joined together so that the sphere may be opened for actuation of a suitable switch in the electric circuit from the batteries contained within the container 19 to the lamp 10b. For this purpose the sphere 2b is indicated in this modification as being formed of two separable halves.

In this modification, as in the modification previously described, the light passing through the surface of the map contained upon the sphere which is desired to be studied is projected through a correcting and enlarging lens 12b before it is projected upon the ground glass surface 9b.

In the modification of my invention illustrated in Figure 5, similar parts have been indicated by similar numerals with the addition of an exponent c thereto.

This modification of my invention is similar to that illustrated in Figure 3 as to manner of support of the sphere 2c in that the sphere may be loosely supported upon a mounting so that it may be rotated by convex rollers mounted with their axes spaced 90° apart.

In this modification of my invention the surface of the sphere is made a reflecting surface as by forming the sphere of glass and forming a mirror surface on the interior of the glass. On the exterior surface of the glass there is placed a negative of the map of the world. In this modification rather than try to project the light through the map surface as in the previously described modification, a multiple lamp source 10c is provided which includes multiple lamps 21 supplied with current from any suitable or desirable source and mounted adjacent curved reflectors 22 so that their rays are projected against a defined area of the map desired to be studied. The light source includes the lens 12c which is mounted therein which is a correcting and magnifying lens so that the rays will be corrected for curvature to produce a flat image upon the ground glass screen 9c. In this modification of my invention it will be apparent the light from the lamps 21 passes through glass of which the sphere is formed and is projected from the inner mirror surface thereof back through the map negative carried by the surface of the sphere 2c and that the lens 12c then causes the image of this surface to be projected upon the ground glass 9c.

In certain modifications of my invention it may be desirable to form the ground glass surface as a curved surface and to merely magnify the image without correcting the same for curvature, in which case the ground glass screen upon which the image is projected would be preferably the same center of curvature as the center of the sphere carrying the map.

In the modification of my invention illustrated in Figure 6 I have shown an adaptation of my invention which is particularly applicable for use in aircraft or ships which are following a course which carries them over only a portion of the earth's surface. I would therefore provide them, i. e., such travellers, with only a spherical segment 2d upon which the correct portion of the earth's surface was represented as dealing with the portion of the earth over which such traveller was passing. This spherical segment would be mounted in a suitable carrier 23 which in turn is mounted by its socket 24 on a ball 25 to permit the segment to be rotated to any desired position. A lamp 10d would be provided for operation in conjunction with a condensing lens or reflector 11d to supply the source of light rays which would be projected through the portion of the spherical segment 2d desired to be enlarged. The light would then pass through a correcting and enlarging lens 12d before the image was projected upon the ground glass 9d. All of this structure could be mounted within the container 1d.

Figure 7:
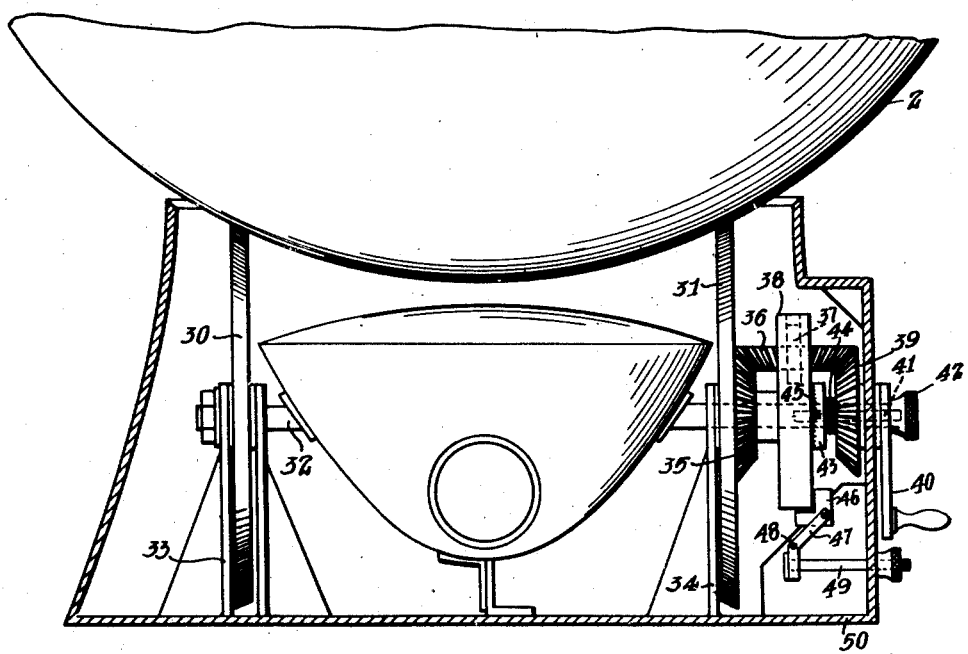
Figure 7 is a diagrammatic illustration of a modified form of globe support embodied in my invention.

In the modified form of support illustrated in Figure 7 I have indicated the globe 2 as supported upon two wheels or discs 30 and 31. The wheel 30 is secured to a shaft 32 which is journaled in standards 33 and 34. The wheel 31 is secured to a bevel gear 35, the hub of which gear is journaled upon the shaft 32. A bevel gear 36 meshes with the bevel gear 35 and is journaled upon a spindle 37 to rotate within a cylindrical carrier 38. The bevel gear 36 in turn meshes with a bevel drive gear 39 which in turn is journaled upon the shaft 32.

Secured to the shaft 32 is a crank 40. Positioned within the interior of the shaft 32 is a lock bar 41 upon the end of which is threaded a knob 42. A lock disc 43 is mounted upon the shaft 32 and is yieldably urged by means of a spring 44 into engagement with the carrier 38. A pin 45 is mounted on the end of the lock bar 41 to move within a slot formed in the shaft 32. This pin 45 is secured to the lock plate 43

A lock means is also provided for holding the cylindrical carrier 38 from rotation and as herein illustrated includes a brake shoe 46 pivotally mounted on the end of a lever 47, which lever 47 is pivoted upon a pin 48. An actuating rod 49 is operatively connected to the outer arm of the lever 47 and extends through the supporting case 50. It will be apparent from the foregoing that the two wheels 30 and 31 may be rotated together in the same direction by rotation of the crank 40 when the bevel gear assembly is locked to rotate as a unit. This rotation will cause the globe supported upon the wheels 30 and 31 to rotate in the same direction as the wheels 30 and 31 are rotating. By rotating one of the wheels 30 or 31 in one direction and the other wheel in the opposite direction, the rotation of the globe supported thereby is in a plane at 90° from the previously recited direction of rotation. This is accomplished by releasing the lock plate 43 by the medium of the knob 42, pulling out the lock bar 44 to engage the shoe 46 with the cylindrical carrier 38 to hold the carrier stationary. Under these circumstances on rotation of the crank 40 the wheel 30 rotates in the direction of rotation of the crank 40 while the wheel 31 rotates in the opposite direction.

Having fully described my invention, it is to be understood that I do not wish to be limited to the details herein set forth, but my invention is of the full scope of the appended claim.

I claim:

In a map device, the combination of a transparent and complete spherical shell having a map of the earth's surface reproduced thereon, a light source outside the spherical shell and adjacent one side thereof, lens means for directing light from said light source substantially diametrically through said one side and to converge and concentrate light rays on the opposite surface of said spherical shell to illuminate a relatively small portion of said opposite surface under high intensity, and means to project an enlarged image of said illuminated portion onto a viewing screen.

LAWRENCE W. VAN DUSEN.

REFERENCES CITED

The following references are of record in the file of this patent:

UNITED STATES PATENTS

| Number | Name | Date |
|---|---|---|
| 947,058 | Duncan | Jan. 18, 1910 |
| 1,042,455 | Manson | Oct. 29, 1912 |
| 1,065,496 | Baldwin | June 24, 1913 |
| 1,218,979 | Cahill | Mar. 13, 1917 |
| 1,289,849 | Manson | Dec. 31, 1918 |
| 1,306,861 | Sparks | June 17, 1919 |
| 1,857,546 | Hirschl | May 10, 1932 |
| 2,027,156 | Dupler | Jan. 7, 1936 |
| 2,094,543 | Lackey et al. | Sept. 28, 1937 |
| 2,187,947 | Marks | Jan. 23, 1940 |
| 2,205,357 | Hagner | June 18, 1940 |
| 2,229,302 | Martin et al. | Jan. 21, 1941 |
| 2,265,992 | Beck | Dec. 16, 1941 |
| 2,271,296 | Hargrave et al. | Jan. 27, 1942 |
| 2,273,876 | Lutz et al. | Feb. 24, 1942 |
| 2,279,162 | Dupler | Apr. 7, 1942 |
| 2,336,436 | Beindorf | Dec. 7, 1943 |
| 2,352,101 | Hutter | June 20, 1944 |